(12) United States Patent
Gu et al.

(10) Patent No.: US 12,124,929 B2
(45) Date of Patent: *Oct. 22, 2024

(54) SYSTEM, METHOD, AND COMPUTER PROGRAM PRODUCT FOR DISTRIBUTED CACHE DATA PLACEMENT

(71) Applicant: Visa International Service Association, San Francisco, CA (US)

(72) Inventors: Yu Gu, Austin, TX (US); Hongqin Song, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,321

(22) Filed: Jan. 25, 2023

(65) Prior Publication Data
US 2023/0169403 A1 Jun. 1, 2023

Related U.S. Application Data

(63) Continuation of application No. 16/722,057, filed on Dec. 20, 2019, now Pat. No. 11,586,979.

(60) Provisional application No. 62/786,745, filed on Dec. 31, 2018.

(51) Int. Cl.
*G06N 20/00* (2019.01)
*G06N 7/01* (2023.01)
*G06Q 30/0601* (2023.01)
*H04L 67/568* (2022.01)

(52) U.S. Cl.
CPC .............. *G06N 20/00* (2019.01); *G06N 7/01* (2023.01); *G06Q 30/0601* (2013.01); *H04L 67/568* (2022.05)

(58) Field of Classification Search
CPC ........ G06N 20/00; G06N 7/01; H04L 67/568; G06Q 30/0601
See application file for complete search history.

(56) References Cited

U.S. PATENT DOCUMENTS

| | | | |
|---|---|---|---|
| 10,078,594 | B2 | 9/2018 | Liu et al. |
| 10,346,360 | B1 | 7/2019 | Basov |
| 10,650,031 | B2 | 5/2020 | Carlsson et al. |
| 11,237,740 | B2 | 2/2022 | Thakkar et al. |
| 11,315,321 | B2 | 4/2022 | Lucas et al. |
| 11,321,777 | B1 | 5/2022 | Gu et al. |
| 2014/0059232 | A1 | 2/2014 | Plattner et al. |
| 2015/0160979 | A1 | 6/2015 | Moffitt |
| 2016/0156714 | A1 | 6/2016 | Farhadi et al. |

(Continued)

FOREIGN PATENT DOCUMENTS

CN 102227121 A 10/2011

OTHER PUBLICATIONS

Calder et al., "Cache-Conscious Data Placement", Eighth International Conference on Architectural Support for Programming Languages and Operating Systems, 1998, pp. 1-11.

(Continued)

*Primary Examiner* — Mohamed A. Wasel
(74) *Attorney, Agent, or Firm* — The Webb Law Firm

(57) ABSTRACT

A method may include obtaining feature data associated with a set of feature inputs of a machine learning model, determining a probability that a subset of the feature data is concurrently used as the set of feature inputs for the machine learning model, and storing the subset of the feature data on a same cache node or server of a plurality of cache nodes or servers based on the probability.

20 Claims, 8 Drawing Sheets

(56) References Cited

U.S. PATENT DOCUMENTS

2016/0156733 A1 6/2016 Farhadi et al.
2017/0017574 A1 1/2017 Deng
2017/0237664 A1 8/2017 Jackson et al.

OTHER PUBLICATIONS

Mukkara, "Techniques to Improve Dynamic Cache Management with Static Data Classification", Massachusetts Institute of Technology, 2016, pp. 1-59.

Mukkara et al., "Whirlpool: Improving Dynamic Cache Management with Static Data Classitication", Proceedings of the Twenty-First International Conference on Architectural Support for Programming Languages and Operating Systems, 2016, pp. 1-15.

"Using Machine Learning to Optimize Cache Resources", 2016, pp. 1-27.

Yu et al., "LRC: Dependency-Aware Cache Management for Data Analytics Clusters", Hong Kong University of Science and Technology, 2017, pp. 1-9.

SYSTEM, METHOD, AND COMPUTER PROGRAM PRODUCT FOR DISTRIBUTED CACHE DATA PLACEMENT

CROSS REFERENCE TO RELATED APPLICATIONS

This application is a continuation of U.S. patent application Ser. No. 16/722,057 filed Dec. 20, 2019, which claims the benefit of U.S. Provisional Application No. 62/786,745, filed Dec. 31, 2018, the disclosures of each of which are hereby incorporated by reference in their entireties.

BACKGROUND

1. Field

This disclosure relates generally to data placement and, in some non-limiting embodiments or aspects, to a system, a method, and a computer program product for distributed cache data placement.

2. Technical Considerations

Data and/or information may be distributed across a plurality of different locations. However, distribution of the data across the plurality of different locations may increase an amount of time required to access and/or use the data and/or information. Accordingly, there is a need in the art to improve data placement for accelerated data access and/or usage.

SUMMARY

Accordingly, provided are systems, methods, and computer program products for improving data placement.

According to some non-limiting embodiments or aspects, provided is a computer-implemented method, comprising: obtaining, with at least one processor, feature data associated with a set of feature inputs of a machine learning model; determining, with at least one processor, a probability that a subset of the feature data is concurrently used as the set of feature inputs for the machine learning model; and storing, with at least one processor, the subset of the feature data on a same cache node or server of a plurality of cache nodes or servers based on the probability.

In some non-limiting embodiments or aspects, the method further comprises: receiving, with at least one processor, a request for a requested subset of the feature data; determining, with at least one processor, a minimum number of the plurality of cache nodes or servers that include the requested subset of the feature data; accessing, with at least one processor, the requested subset of the feature data at the minimum number of the plurality of cache nodes or servers; and providing, with at least one processor, the requested subset of the feature data to the machine learning model.

In some non-limiting embodiments or aspects, determining the probability is based on the request.

In some non-limiting embodiments or aspects, the requested subset of feature data is associated with a transaction at a merchant system.

In some non-limiting embodiments or aspects, the method further comprises: determining, with at least one processor, another probability of a different subset of the feature data associated with another set of feature inputs of a different machine learning model than the machine learning model being concurrently requested by the different machine learning model; and storing, with at least one processor, the subset of the feature data on the same cache node or server of the plurality of cache nodes or servers based on the probability and the another probability.

In some non-limiting embodiments or aspects, storing the subset of the feature data on the same cache node or server uses a bin-packing algorithm.

In some non-limiting embodiments or aspects, determining the minimum number of the plurality of cache nodes or servers that include the requested subset of feature data uses a set cover algorithm.

According to some non-limiting embodiments or aspects, provided is a computing system comprising one or more processors programmed and/or configured to: obtain feature data associated with a set of feature inputs of a machine learning model; determine a probability that a subset of the feature data is concurrently used as the set of feature inputs for the machine learning model; and store the subset of the feature data on a same cache node or server of a plurality of cache nodes or servers based on the probability.

In some non-limiting embodiments or aspects, the one or more processors are further programmed and/or configured to: receive a request for a requested subset of the feature data; determine a minimum number of the plurality of cache nodes or servers that include the requested subset of the feature data; access the requested subset of the feature data at the minimum number of the plurality of cache nodes or servers; and provide the requested subset of the feature data to the machine learning model.

In some non-limiting embodiments or aspects, the one or more processors determine the probability based on the request.

In some non-limiting embodiments or aspects, the requested subset of feature data is associated with a transaction at a merchant system.

In some non-limiting embodiments or aspects, the one or more processors are further programmed and/or configured to: determine another probability of a different subset of the feature data associated with another set of feature inputs of a different machine learning model than the machine learning model being concurrently requested by the different machine learning model; and store the subset of the feature data on the same cache node or server of the plurality of cache nodes or servers based on the probability and the another probability.

In some non-limiting embodiments or aspects, the one or more processors store the subset of the feature data on the same cache node or server using a bin-packing algorithm.

In some non-limiting embodiments or aspects, the one or more processors determine the minimum number of the plurality of cache nodes or servers that include the requested subset of feature data using a set cover algorithm.

According to some non-limiting embodiments or aspects, provided is a computer program product comprising at least one non-transitory computer-readable medium including program instructions that, when executed by at least one processor, cause the at least one processor to: obtain feature data associated with a set of feature inputs of a machine learning model; determine a probability that a subset of the feature data is concurrently used as the set of feature inputs for the machine learning model; and store the subset of the feature data on a same cache node or server of a plurality of cache nodes or servers based on the probability.

In some non-limiting embodiments or aspects, the instructions further cause the at least one processor to: receive a request for a requested subset of the feature data; determine a minimum number of the plurality of cache nodes or servers that include the requested subset of the feature data; access the requested subset of the feature data at the minimum number of the plurality of cache nodes or servers; and provide the requested subset of the feature data to the machine learning model.

In some non-limiting embodiments or aspects, the instructions cause the at least one processor to determine the probability based on the request.

In some non-limiting embodiments or aspects, the requested subset of feature data is associated with a transaction at a merchant system.

In some non-limiting embodiments or aspects, the instructions further cause the at least one processor to: determine another probability of a different subset of the feature data associated with another set of feature inputs of a different machine learning model than the machine learning model being concurrently requested by the different machine learning model; and store the subset of the feature data on the same cache node or server of the plurality of cache nodes or servers based on the probability and the another probability.

In some non-limiting embodiments or aspects, the instructions further cause the at least one processor to: store the subset of the feature data on the same cache node or server using a bin-packing algorithm; and determine the minimum number of the plurality of cache nodes or servers that include the requested subset of feature data using a set cover algorithm.

Further embodiments or aspects are set forth in the following numbered clauses:

Clause 1. A computer-implemented method, comprising: obtaining, with at least one processor, feature data associated with a set of feature inputs of a machine learning model; determining, with at least one processor, a probability that a subset of the feature data is concurrently used as the set of feature inputs for the machine learning model; and storing, with at least one processor, the subset of the feature data on a same cache node or server of a plurality of cache nodes or servers based on the probability.

Clause 2. The computer-implemented method of clause 1, further comprising: receiving, with at least one processor, a request for a requested subset of the feature data; determining, with at least one processor, a minimum number of the plurality of cache nodes or servers that include the requested subset of the feature data; accessing, with at least one processor, the requested subset of the feature data at the minimum number of the plurality of cache nodes or servers; and providing, with at least one processor, the requested subset of the feature data to the machine learning model.

Clause 3. The computer-implemented method of clauses 1 or 2, wherein determining the probability is based on the request.

Clause 4. The computer-implemented method of any of clauses 1-3, wherein the requested subset of feature data is associated with a transaction at a merchant system.

Clause 5. The computer-implemented method of any of clauses 1-4, further comprising: determining, with at least one processor, another probability of a different subset of the feature data associated with another set of feature inputs of a different machine learning model than the machine learning model being concurrently requested by the different machine learning model; and storing, with at least one processor, the subset of the feature data on the same cache node or server of the plurality of cache nodes or servers based on the probability and the another probability.

Clause 6. The computer-implemented method of any of clauses 1-5, wherein storing the subset of the feature data on the same cache node or server uses a bin-packing algorithm.

Clause 7. The computer-implemented method of any of clauses 1-6, wherein determining the minimum number of the plurality of cache nodes or servers that include the requested subset of feature data uses a set cover algorithm.

Clause 8. A computing system comprising: one or more processors programmed and/or configured to: obtain feature data associated with a set of feature inputs of a machine learning model; determine a probability that a subset of the feature data is concurrently used as the set of feature inputs for the machine learning model; and store the subset of the feature data on a same cache node or server of a plurality of cache nodes or servers based on the probability.

Clause 9. The computing system of clause 8, wherein the one or more processors are further programmed and/or configured to: receive a request for a requested subset of the feature data; determine a minimum number of the plurality of cache nodes or servers that include the requested subset of the feature data; access the requested subset of the feature data at the minimum number of the plurality of cache nodes or servers; and provide the requested subset of the feature data to the machine learning model.

Clause 10. The computing system of clauses 8 or 9, wherein the one or more processors determine the probability based on the request.

Clause 11. The computing system of any of clauses 8-10, wherein the requested subset of feature data is associated with a transaction at a merchant system.

Clause 12. The computing system of any of clauses 8-11, wherein the one or more processors are further programmed and/or configured to: determine another probability of a different subset of the feature data associated with another set of feature inputs of a different machine learning model than the machine learning model being concurrently requested by the different machine learning model; and store the subset of the feature data on the same cache node or server of the plurality of cache nodes or servers based on the probability and the another probability.

Clause 13. The computing system of any of clauses 8-12, wherein the one or more processors store the subset of the feature data on the same cache node or server using a bin-packing algorithm.

Clause 14. The computing system of any of clauses 8-13, wherein the one or more processors determine the minimum number of the plurality of cache nodes or servers that include the requested subset of feature data using a set cover algorithm.

Clause 15. A computer program product comprising at least one non-transitory computer-readable medium including program instructions that, when executed by at least one processor, cause the at least one processor to: obtain feature data associated with a set of feature inputs of a machine learning model; determine a probability that a subset of the feature data is concurrently used as the set of feature inputs for the machine learning model; and store the subset of the feature data on a same cache node or server of a plurality of cache nodes or servers based on the probability.

Clause 16. The computer program product of clause 15, wherein the instructions further cause the at least one processor to: receive a request for a requested subset of the feature data; determine a minimum number of the plurality of cache nodes or servers that include the requested subset of the feature data; access the requested subset of the feature data at the minimum number of the plurality of cache nodes or servers; and provide the requested subset of the feature data to the machine learning model.

Clause 17. The computer program product of clauses 15 or 16, wherein the instructions cause the at least one processor to determine the probability based on the request.

Clause 18. The computer program product of any of clauses 15-17, wherein the requested subset of feature data is associated with a transaction at a merchant system.

Clause 19. The computer program product of any of clauses 15-18, wherein the instructions further cause the at least one processor to: determine another probability of a different subset of the feature data associated with another set of feature inputs of a different machine learning model than the machine learning model being concurrently requested by the different machine learning model; and store the subset of the feature data on the same cache node or server of the plurality of cache nodes or servers based on the probability and the another probability.

Clause 20. The computer program product of any of clauses 15-19, wherein the instructions further cause the at least one processor to: store the subset of the feature data on the same cache node or server using a bin-packing algorithm; and determine the minimum number of the plurality of cache nodes or servers that include the requested subset of feature data using a set cover algorithm.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details of non-limiting embodiments or aspects are explained in greater detail below with reference to the exemplary embodiments that are illustrated in the accompanying schematic figures, in which.

DESCRIPTION

Figure 1A:
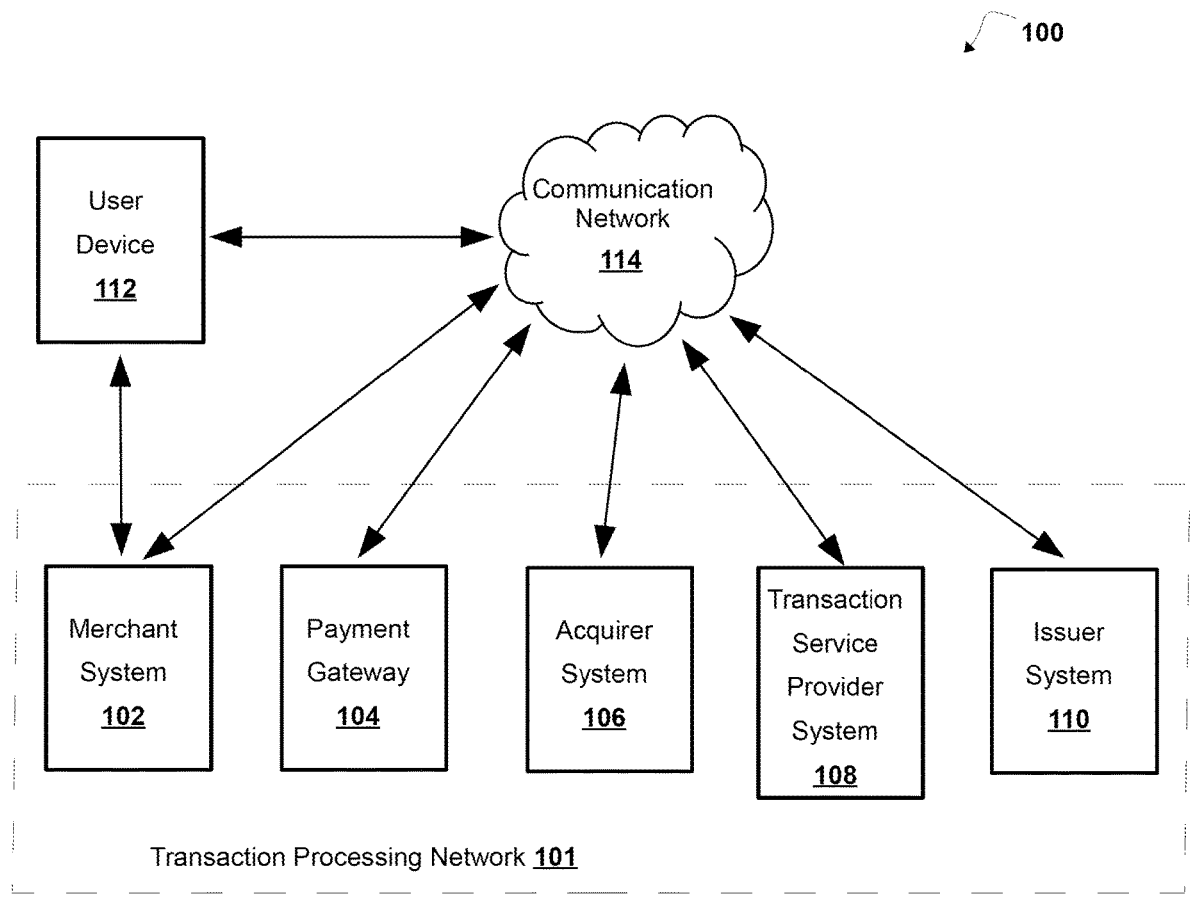
FIG. 1A is a diagram of a non-limiting embodiment or aspect of an environment in which systems, devices, products, apparatus, and/or methods as described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

For purposes of the description hereinafter, the terms "end," "upper," "lower," "right," "left," "vertical," "horizontal," "top," "bottom," "lateral," "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects of the embodiments disclosed herein are not to be considered as limiting unless otherwise indicated.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "acquirer institution" may refer to an entity licensed and/or approved by the transaction service provider to originate transactions (e.g., payment transactions) using a portable financial device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computer systems, computer devices, software applications, and/or the like operated by or on behalf of an acquirer institution.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes. The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a security card, a computer, an access card, a wireless terminal, and/or a transponder, and/or the like. In some non-limiting embodiments or aspects, the portable financial device may include a volatile or a non-volatile memory to store information, (e.g., an account identifier, a name of the account holder, and/or the like).

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

Provided are improved systems, devices, products, apparatus, and/or methods for data placement. Existing distributed data placement systems (e.g., existing distributed caching systems) replicate data for certain applications (e.g., mission critical applications). For example, existing distributed caching systems may provide primary data and replicated data copies of the primary data at different locations (e.g., different servers) for increased resiliency. As an example, by providing the primary data and the replicated data at different locations, existing distributed caching systems may reduce and/or prevent data loss and/or an increased data access time when data at one of the locations is unavailable (e.g., during a server failure).

Figure 6:
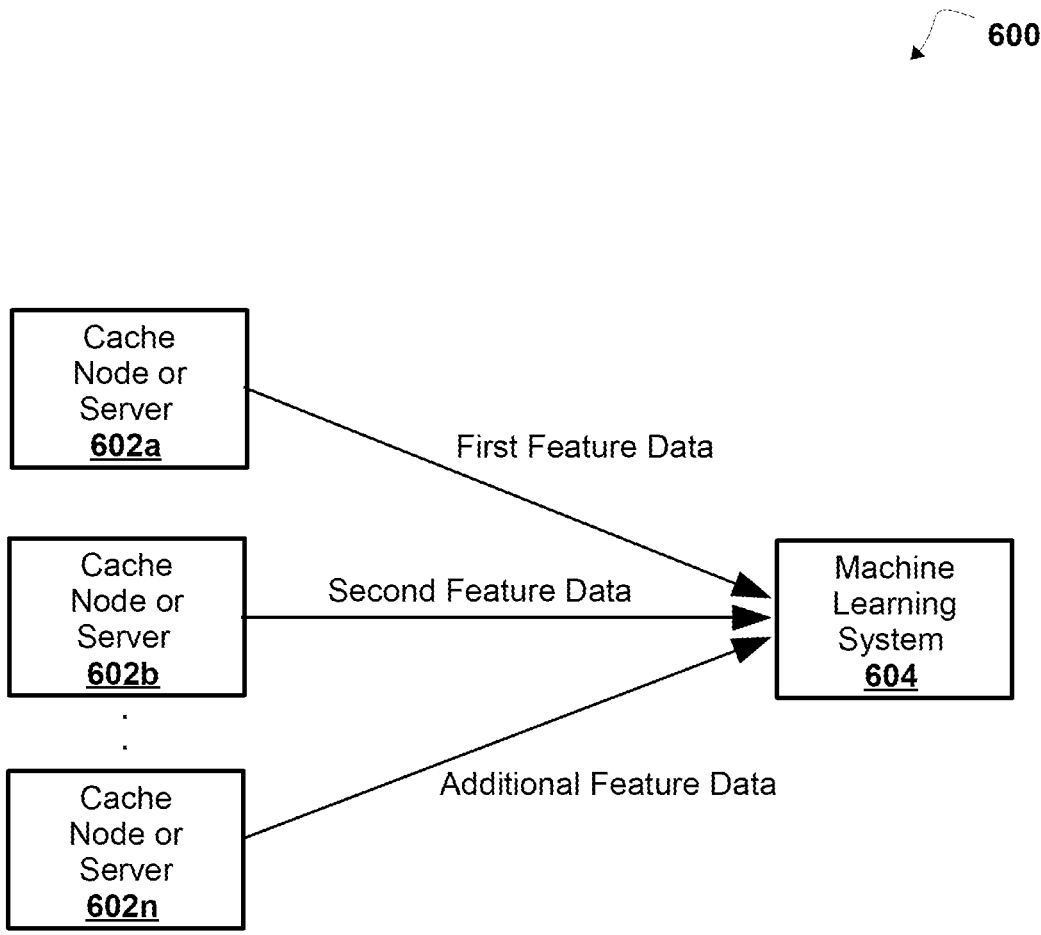
FIG. 6 is a diagram of an existing distributed caching system.

Machine learning workloads are progressively using increased amounts of input data. For example, machine learning algorithms or models may use a more diverse set of feature inputs from existing distributed caching systems to accelerate model training and/or inference time. As an example, and referring to FIG. 6, which is a diagram of an existing distributed caching system 600, feature data associated with feature inputs of a machine learning algorithm or model may be distributed across a plurality of cache nodes or servers 602a, 602b, . . . 602n. For example, due to data sharding and/or partitioning, machine learning system 604, which implements the machine learning algorithm or model, may retrieve data from multiple different cache nodes or servers to obtain the feature data or elements associated with each feature input of the set of feature inputs for training the machine learning model and/or applying the trained machine learning model for inferencing, which increases the training time and/or the inference time of the machine learning model. As an example, machine learning system 604 may retrieve first feature data (e.g., feature data associated with an account identifier) associated with a first feature input from a first cache node or server 602a, second feature data (e.g., feature data associated with an IP address) associated with a second feature input from a second cache node or server 602b, additional feature data (e.g., feature data associated with a mailing address, etc.) associated with an additional feature input from an $n^{th}$ cache node or server 602n, and/or the like.

In this way, existing distributed caching systems have no mechanism for placing or storing data according to a probability of the data being concurrently requested, accessed, or used by a machine learning model and/or a system thereof. Accordingly, a slowest cache node or server of the plurality of existing cache nodes or servers 602a, 602b, . . . 602n and/or a slowest link between machine learning system 604 and the plurality of cache nodes or servers 602a, 602b, . . . 602n may dictate an overall system latency for training the machine learning model and/or for applying the machine learning model for inferencing.

Non-limiting embodiments or aspects of the present disclosure are directed to systems, devices, products, apparatus, and/or methods that place or store data according to a probability of the data being concurrently requested, accessed, or used by a machine learning model. For example, a method may include obtaining feature data associated with a set of feature inputs of a machine learning model, determining a probability that a subset of the feature data is concurrently used as the set of feature inputs for the machine learning model, and storing the subset of the feature data on a same cache node or server of a plurality of cache nodes or servers based on the probability.

In this way, non-limiting embodiments or aspects of the present disclosure provide for data placement with context for accelerated machine learning, which enables accelerated training of the machine learning model and/or accelerated application of the trained machine learning model for inferencing, as well as dynamic determination and/or updating of data placement within a distributed caching system.

Referring now to FIG. 1A, FIG. 1A is a diagram of an example environment 100 in which devices, systems, methods, and/or products described herein, may be implemented. As shown in FIG. 1A, environment 100 includes transaction processing network 101, which can include merchant system 102, payment gateway 104, acquirer system 106, transaction service provider system 108, and/or issuer system 110, user device 112, and/or communication network 114. Transaction processing network 101, merchant system 102, payment gateway 104, acquirer system 106, transaction service provider system 108, issuer system 110, and/or user device 112 may interconnect (e.g., establish a connection to communicate) via wired connections, wireless connections, or a combination of wired and wireless connections.

Merchant system 102 may include one or more devices capable of receiving information from payment gateway 104, acquirer system 106, transaction service provider system 108, issuer system 110, and/or user device 112 via communication network 114 and/or communicating information to payment gateway 104, acquirer system 106, transaction service provider system 108, issuer system 110, and/or user device 112 via communication network 114. Merchant system 102 may include a device capable of receiving information from user device 112 via a communication connection (e.g., an NFC communication connection, an RFID communication connection, a Bluetooth® communication connection, and/or the like) with user device 112, and/or communicating information to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway 104 may include one or more devices capable of receiving information from merchant system 102, acquirer system 106, transaction service provider system 108, issuer system 110, and/or user device 112 via communication network 114 and/or communicating information to merchant system 102, acquirer system 106, transaction service provider system 108, issuer system 110, and/or user device 112 via communication network 114. For example, payment gateway 104 may include a computing device, such as a server, a group of servers, and/or other like devices. In some non-limiting embodiments or aspects, payment gateway 104 is associated with a payment gateway as described herein.

Acquirer system 106 may include one or more devices capable of receiving information from merchant system 102, payment gateway 104, transaction service provider system 108, issuer system 110, and/or user device 112 via communication network 114 and/or communicating information to merchant system 102, payment gateway 104, transaction service provider system 108, issuer system 110, and/or user device 112 via communication network 114. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information from merchant system 102, payment gateway 104, acquirer system 106, issuer system 110, and/or user device 112, via communication network 114 and/or communicating information to merchant system 102, payment gateway 104, acquirer system 106, issuer system 110, and/or user device 112 via communication network 114. For example, transaction service provider system 108 may include a computing device, such as a server (e.g., a transaction processing server), a group of servers, and/or other like devices. In some non-limiting embodiments or aspects, transaction service provider system 108 may be associated with a transaction service provider as described herein.

Issuer system 110 may include one or more devices capable of receiving information from merchant system 102, payment gateway 104, acquirer system 106, transaction service provider system 108, and/or user device 112 via communication network 114 and/or communicating information to merchant system 102, payment gateway 104, acquirer system 106, transaction service provider system 108, and/or user device 112 via communication network 114. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway 104, acquirer system 106, transaction service provider system 108, and/or issuer system 110.

User device 112 may include one or more devices capable of receiving information from merchant system 102, payment gateway 104, acquirer system 106, transaction service provider system 108, and/or issuer system 110 via communication network 114 and/or communicating information to merchant system 102, payment gateway 104, acquirer system 106, transaction service provider system 108, and/or issuer system 110 via communication network 114. For example, user device 112 may include a client device and/or the like. In some non-limiting embodiments or aspects, user device 112 may be capable of receiving information (e.g., from merchant system 102) via a short-range wireless communication connection (e.g., an NFC communication connection, an RFID communication connection, a Bluetooth® communication connection, and/or the like), and/or communicating information (e.g., to merchant system 102) via a short-range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Figure 1B:
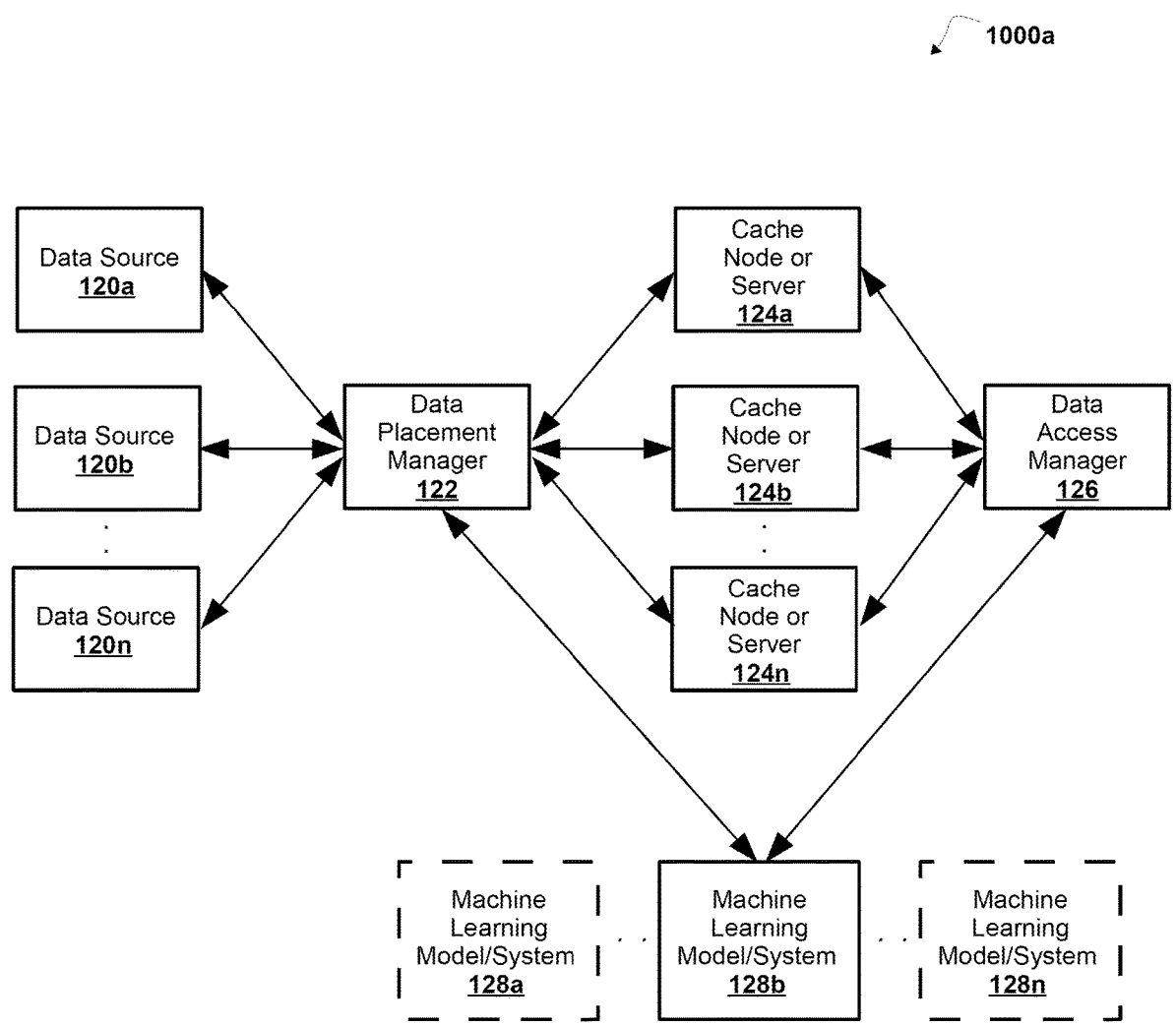
FIG. 1B is a diagram of a non-limiting embodiment or aspect of an implementation of one or more devices and/or one or more systems of FIG. 1A.

Referring now to FIG. 1B, FIG. 1B is a diagram of a non-limiting embodiment or aspect of an implementation 1000*a* of one or more devices and/or one or more systems of FIG. 1A. For example, merchant system 102, payment gateway 104, acquirer system 106, transaction service provider system 108, issuer system 110, user device 112, or any combination thereof may include a plurality of data sources 120*a*, 120*b*, . . . 120*n*, data placement manager 122, a plurality of cache nodes or servers 124*a*, 124*b*, . . . 124*n*, a data access manager 126, a plurality of machine learning models 128*a*, 128*b*, . . . 128*n* and/or systems thereof, or any combination thereof.

The plurality of data sources 120*a*, 120*b*, . . . 120*n* may include one or more devices capable of storing feature data associated with feature inputs of the plurality of machine learning models 128*a*, 128*b*, . . . 128*n*. For example, the plurality of data sources 120*a*, 120*b*, . . . 120*n* may include a plurality of databases that store feature data. In some non-limiting embodiments or aspects, one or more data sources of the plurality of data sources 120*a*, 120*b*, . . . 120*n* include a data source stream. For example, a data source stream may include a stream of data that is continuously or periodically updated as new data associated with the one or more data sources is received, and the one or more data sources can be continuously or periodically updated as the transaction data is received via the data source stream. In some non-limiting embodiments or aspects, feature data includes any data or element that can be used as a feature input to a machine learning model.

In some non-limiting embodiments or aspects, feature data includes transaction data. For example, transaction data may include transaction parameters associated with transactions, such as payment transactions initiated and/or conducted with an electronic wallet application, and/or the like. Non-limiting examples of transaction parameters include: electronic wallet card data, decision data, authorization data, account identifier (e.g., PAN, etc.), transaction amount, transaction date and time, conversion rate of currency, merchant type, acquiring institution country, PAN country, response code, merchant name/location, type of currency, IP address, and/or the like. Response code may refer to a successful approval/completion of a transaction, denial because card reported as lost or stolen, do not honor, partial approval, VIP approval (VIP program), amount exceeds maximum, insufficient funds, incorrect PIN, suspected fraud, activity amount exceeded, allowable number of PIN-entry tries exceeded, and/or the like. In such an example, a data source stream may include transaction data associated with a transaction initiated, processed, and/or currently being processed in transaction processing network 101, and/or the plurality of data sources 120*a*, 120*b*, . . . 120*n* may include an account identifier (e.g., a PAN, etc.) data source, a merchant data source, an IP data source, an external or third-party data source, and/or the like.

In some non-limiting embodiments or aspects, electronic wallet card data includes one or more of data associated with an identifier regarding a portable financial device to be provided to an electronic wallet application, data associated with an identifier of an issuer associated with the portable financial device to be provided to an electronic wallet application, data associated with an identifier of a transaction service provider associated with the portable financial device to be provided to an electronic wallet application, data associated with a name of a user associated with the portable financial device to be provided to an electronic wallet application, data associated with an account identifier of an account associated with the portable financial device to be provided to an electronic wallet application, and/or the like.

Data placement manager 122 may include one or more devices capable of obtaining, for example, from one or more of the plurality of data sources 120*a*, 120*b*, . . . 120*n*, from transaction processing network 101, from one or more of the plurality of cache nodes or servers 124*a*, 124*b*, . . . 124*c*, from data access manager 126, from one or more of the plurality of machine learning models 128*a*, 128*b*, . . . 128*n* and/or systems thereof, or any combination thereof, feature data associated with a set of feature inputs of a machine learning model (e.g., feature data associated with a set of feature inputs one or more of the plurality of machine learning models 128*a*, 128*b*, . . . 128*n*, etc.); determining a probability that a subset of the feature data is concurrently used as the set of feature inputs for the machine learning model; and storing the subset of the feature data on a same cache node or server of the plurality of cache nodes or servers 124*a*, 124*b*, . . . 124*n* based on the probability.

The plurality of cache nodes or servers 124*a*, 124*b*, . . . 124*n* may include one or more devices capable of storing feature data associated with feature inputs of the plurality of machine learning models 128*a*, 128*b*, . . . 128*n*. For example, the plurality of cache nodes or servers 124*a*, 124*b*, . . . 124*n* may include a plurality of databases or data structures and/or a distributed caching system that store feature data.

Data access manager 126 may include one or more devices capable of receiving a request, for example, from a machine learning model and/or system thereof of the plurality of machine learning models 128*a*, 128*b*, . . . 128*n* and/or systems thereof, for a requested subset of the feature data; determining a minimum number of the plurality of cache nodes or servers 124*a*, 124*b*, . . . 124*n* that include the requested subset of the feature data; accessing the requested subset of the feature data at the minimum number of the plurality of cache nodes or servers 128*a*, 128*b*, . . . 128*n*; and providing the requested subset of the feature data to the machine learning model and/or system thereof of the plurality of machine learning models 128*a*, 128*b*, . . . 128*n* and/or systems thereof. For example, and referring also to FIG. 1C, which is a diagram of a non-limiting embodiment or aspect of an implementation 1000*b* of one or more devices and/or one or more systems of FIG. 1A, data access manager 126 may determine a single cache node or server (e.g., cache node or server 124*b*) of the plurality of cache nodes or servers 124*a*, 124*b*, . . . 124*n* that includes the requested subset of the feature data (e.g., feature data associated with a particular account identifier, feature data associated with a particular IP address, feature data associated with a particular mailing address, etc.) for a machine learning model (e.g., machine learning model 128*b*); access the requested subset of the feature data at the single cache node or server (e.g., at cache node or server 124*b*) of the plurality of cache nodes or servers 124*a*, 124*b*, . . . 124*n*; and provide the requested subset of the feature data to the machine learning model 128*b* and/or system thereof from the single cache node or server. Accordingly, accelerated training of the machine learning model and/or accelerated application of the trained machine learning model for inferencing may be provided.

A machine learning model of the plurality of machine learning models 128*a*, 128*b*, . . . 128*n* and/or systems thereof may be based on one or more machine learning techniques or modeling techniques (e.g., a pattern recognition technique, a data mining technique, a heuristic technique, a supervised learning technique, an unsupervised learning technique, a decision tree algorithm, a gradient boosted decision tree algorithm, a neural network algorithm, a deep neural network algorithm, a convolutional neural network algorithm, etc.). In some non-limiting embodiments or aspects, a system of the plurality of machine learning models 128a, 128b, . . . 128n and/or systems thereof generates or trains a model of the plurality of machine learning models 128a, 128b, . . . 128n based on the one or more machine learning techniques or modeling techniques and feature data. In some non-limiting embodiments or aspects, a model and/or a system thereof of the plurality of machine learning models 128a, 128b, . . . 128n generates a determination, a prediction, or an inference based on feature data, which can be accessed at and/or retrieved from one or more of the plurality of cache nodes or servers 124a, 124b, . . . 124n by data access manager 126, input to the machine learning model as feature inputs. For example, a machine learning model and/or a system thereof of the plurality of machine learning models 128a, 128b, . . . 128n and/or systems thereof may make a determination, a prediction, or an inference associated with a transaction (e.g., a prediction of whether the transaction is a fraudulent transaction, a prediction of other data associated with the transaction, etc.) based on transaction data associated with the transaction, which can be accessed at and/or retrieved from one or more of the plurality of cache nodes or servers 124a, 124b, . . . 124n by data access manager 126.

Figure 1C:
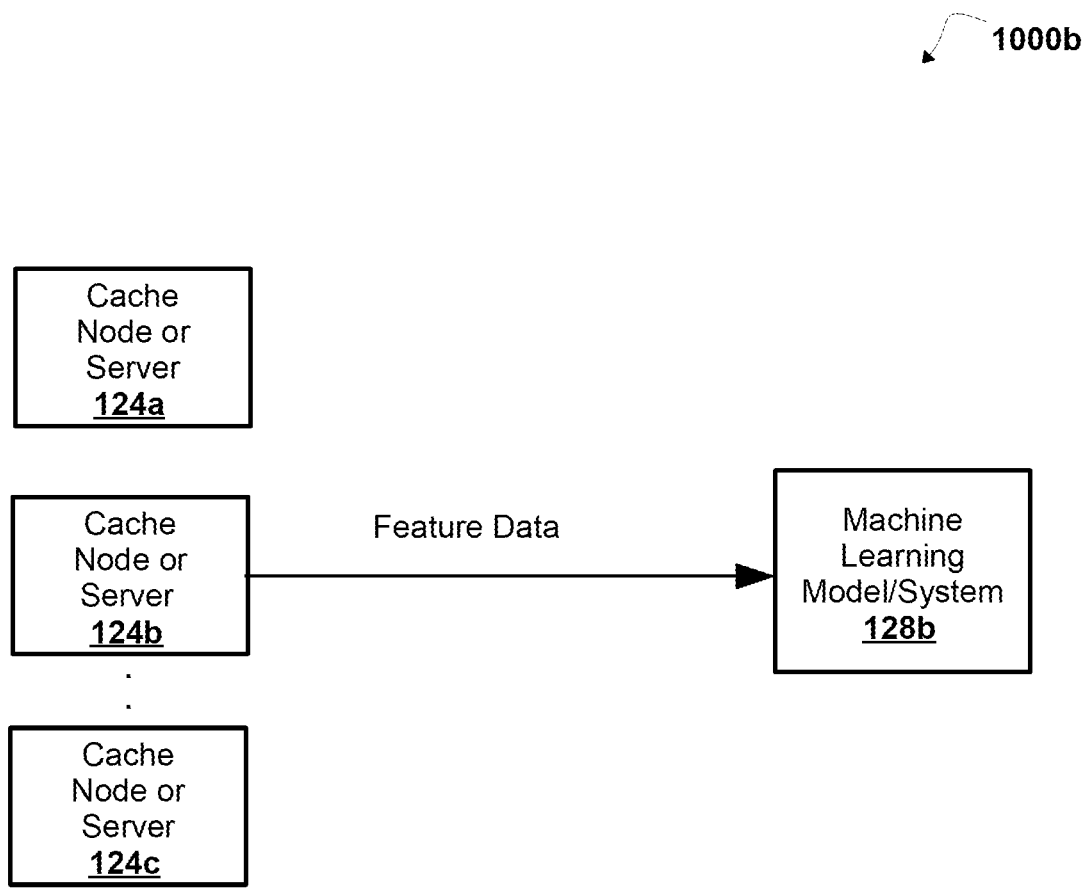
FIG. 1C is a diagram of a non-limiting embodiment or aspect of an implementation of one or more devices and/or one or more systems of FIG. 1A.

The number and arrangement of devices, systems, and networks shown in FIGS. 1A-1C are provided as an example. There may be additional devices, systems, and/or networks, fewer devices, systems, and/or networks, different devices, systems, and/or networks, or differently arranged devices, systems, and/or networks than those shown in FIGS. 1A-1C. Furthermore, two or more devices and/or systems shown in FIGS. 1A-1C may be implemented within a single device and/or system, or a single device and/or system shown in FIGS. 1A-1C may be implemented as multiple, distributed devices and/or systems. Additionally or alternatively, a set of devices and/or systems (e.g., one or more devices or systems) of environment 100 (and/or implementation 1000a and/or implementation 1000b) may perform one or more functions described as being performed by another set of devices or systems of environment 100 (and/or implementation 1000a and/or implementation 1000b).

Figure 2:
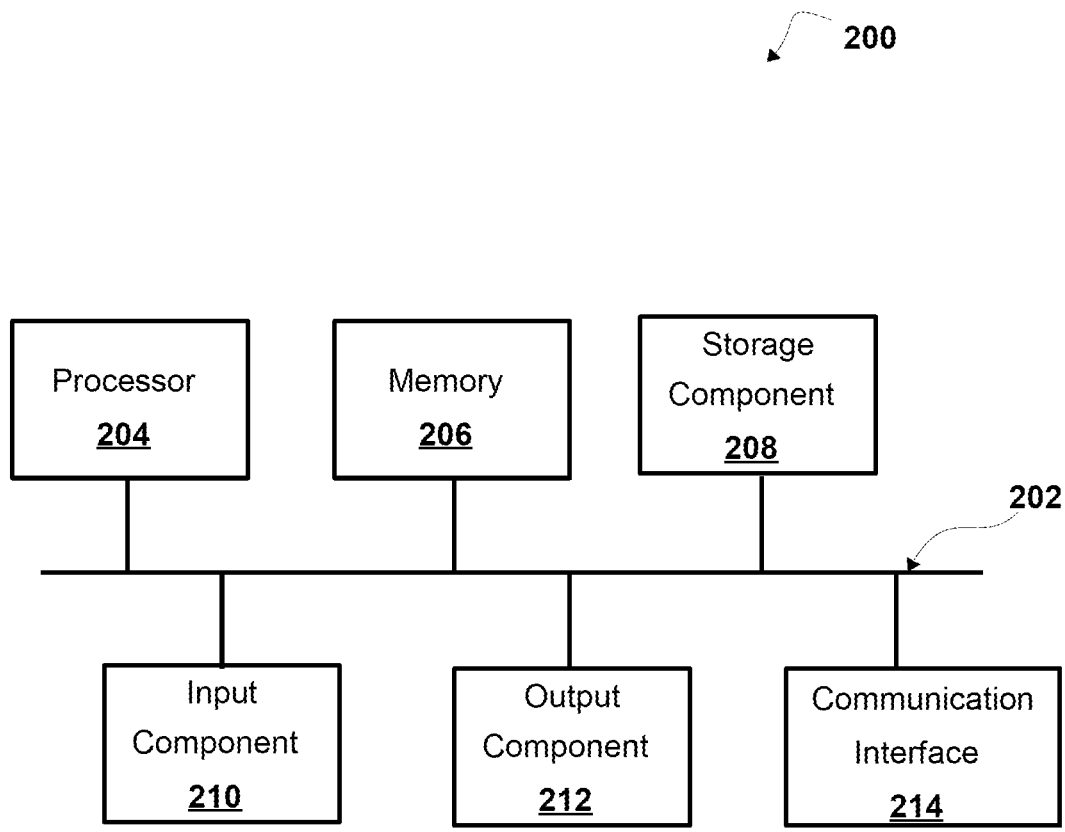
FIG. 2 is a diagram of a non-limiting embodiment or aspect of components of one or more devices and/or one or more systems of FIGS. 1A-1C.

Referring now to FIG. 2, FIG. 2 is a diagram of example components of a device 200. Device 200 may correspond to one or more devices of transaction processing network 101, one or more devices of merchant system 102, one or more devices of payment gateway 104, one or more devices of acquirer system 106, one or more devices of transaction service provider system 108, one or more devices of issuer system 110, one or more devices of user device 112, and/or one or more devices of communication network 114. In some non-limiting embodiments or aspects, one or more devices of transaction processing network 101, one or more devices of merchant system 102, one or more devices of payment gateway 104, one or more devices of acquirer system 106, one or more devices of transaction service provider system 108, one or more devices of issuer system 110, one or more devices of user device 112, and/or one or more devices of communication network 114 can include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, an electroencephalogram (EEG) monitor, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, the information may include feature data, training data, transaction data, account data, input data, output data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
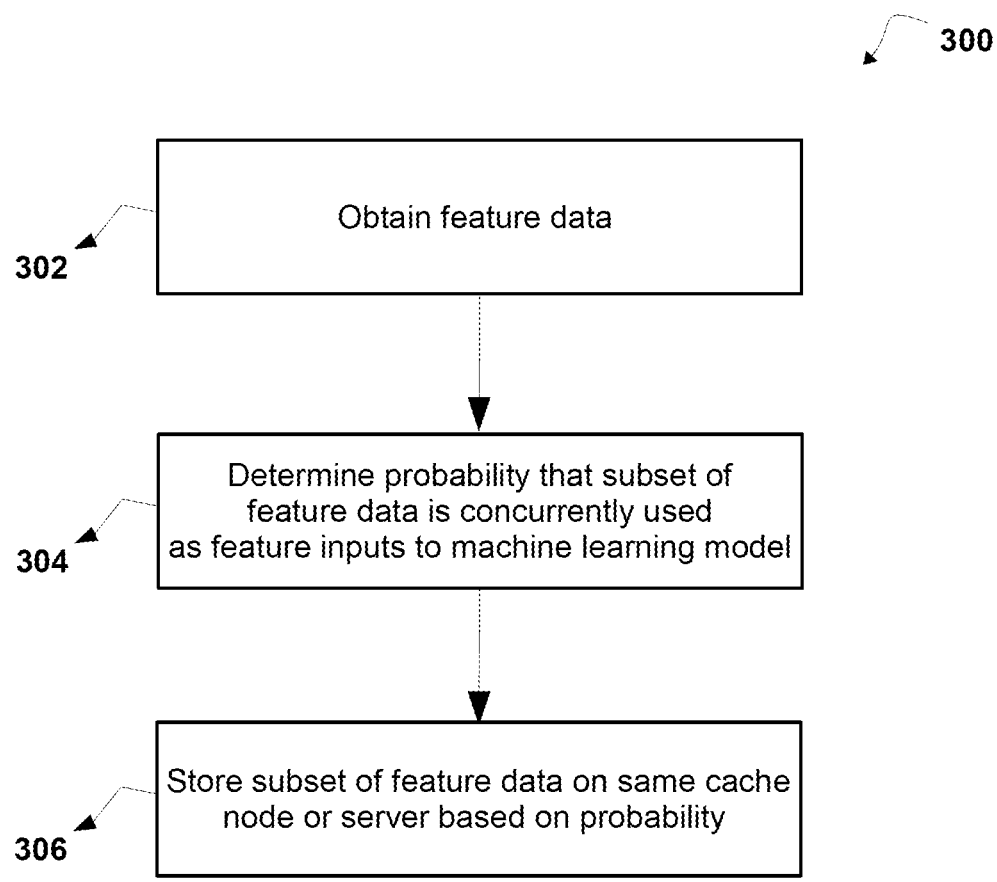
FIG. 3 is a flowchart illustrating a non-limiting embodiment or aspect of a process for data placement.

Referring now to FIG. 3, FIG. 3 is a flowchart of a non-limiting embodiment or aspect of a process 300 for data placement. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway 104 (e.g., one or more devices of payment gateway 104), acquirer system 106 (e.g., one or more devices of acquirer system 106), issuer system 110 (e.g., one or more devices of issuer system 110), and/or user device 112.

As shown in FIG. 3, at step 302, process 300 includes obtaining feature data. For example, transaction service provider system 108 obtains feature data. As an example, transaction service provider system 108 (e.g., data placement manager 122, etc.) obtains feature data associated with a set of feature inputs of a machine learning model (e.g., one or more machine learning models of the plurality of machine learning models 128a, 128b, . . . 128n, etc.).

Figure 5:
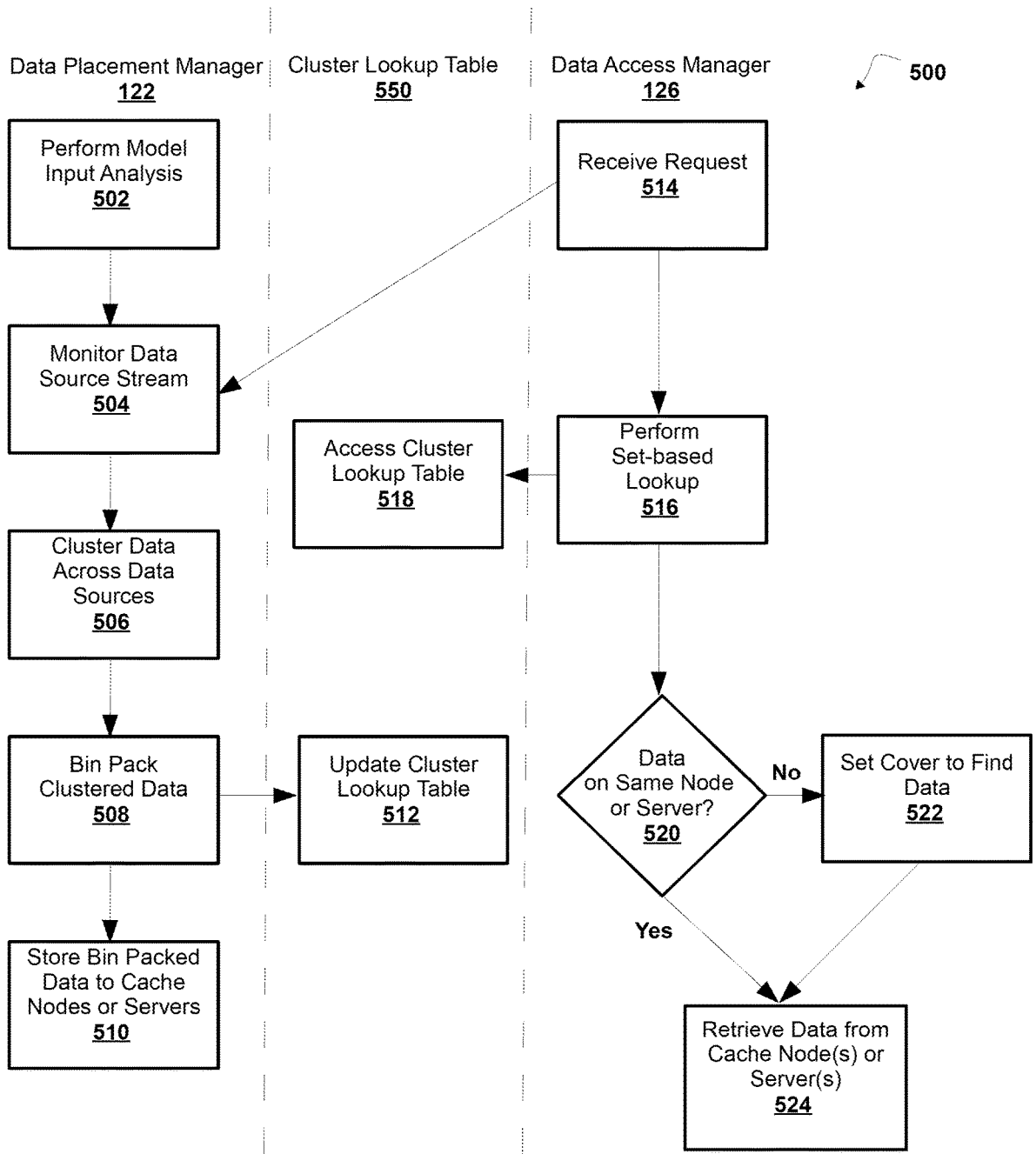
FIG. 5 is a diagram of a non-limiting embodiment or aspect of an implementation of a process for data placement disclosed herein.

In some non-limiting embodiments or aspects, transaction service provider system 108 obtains feature data by determining (e.g., identifying, collecting, etc.) feature data associated with a set of feature inputs of a machine learning model. For example, referring now to FIG. 5, FIG. 5 is a diagram of a non-limiting embodiment or aspect of a process 500 for data placement. As shown in FIG. 5, at reference number 502, transaction service provider system 108 (e.g., data placement manager 122, etc.) may perform model input analysis on the plurality of machine learning models 128a, 128b, . . . 128n and/or systems thereof. As an example, a first machine learning model 128a and/or system thereof may be programmed and/or configured to receive and/or request feature inputs A, B, and C, and a second machine learning model 128b and/or system thereof may be programmed and/or configured to receive and/or request feature inputs C, D, and E. In such an example, transaction service provider system 108 (e.g., data placement manager 122, etc.) may determine a set of feature inputs A, B, C, D, and E associated with the first and second machine learning models 128a and 128b, determine a set of feature inputs A, B, and C associated with first machine learning model 128a, determine a set of feature inputs C, D, and E associated with second machine learning model 128b, and determine (e.g., identify, collect, etc.) feature data associated with the feature inputs A, B, C, D, and E.

Still referring to FIG. 5, at reference number 504, transaction service provider system 108 (e.g., data placement manager 122, etc.) may monitor a data source stream of feature data and/or requests for feature data. In some non-limiting embodiments or aspects, transaction service provider system 108 (e.g., data placement manager 122, etc.) may receive one or more requests for one or more subsets of feature data (e.g., training data, etc.) for training a machine learning model (e.g., for training one or more of the plurality of machine learning models 128a, 128b, . . . 128n). In some non-limiting embodiments or aspects, training data may include a classification label associated with a transaction (e.g., a prior transaction, etc.), such as a classification label that indicates that the transaction (or a request for transaction data associated with the transaction) is associated with a particular condition (e.g. a true label, a false label, etc.).

In some non-limiting embodiments or aspects, transaction service provider system 108 (e.g., data placement manager 122, etc.) may receive a request for a requested subset of the feature data to be input to a machine learning model of the plurality of machine learning models 128a, 128b, . . . 128n for inferencing. For example, the request may include a request for a requested subset of the feature data associated with a transaction (e.g., a current transaction, a new transaction, a transaction being processed in transaction processing network 101, etc.). As an example, transaction service provider system 108 (e.g., data placement manager 122, etc.) monitors the data source stream of feature data and requests associated therewith and dynamically determines and/or updates clustering of feature data and data placement within the plurality of cache nodes or servers 124a, 124b, . . . 124n as new requests are received and/or new transactions are initiated and/or processed in transaction processing network 101 based on the feature data associated with each new request and/or transaction as further described herein.

As shown in FIG. 3, at step 304 process 300 includes determining a probability that a subset of feature data is concurrently used as feature inputs to a machine learning model. For example, transaction service provider system 108 determines a probability that a subset of feature data is concurrently used as feature inputs to a machine learning model. As an example, transaction service provider system 108 (e.g., data placement manager 122, etc.) determines a probability (e.g., a certainty, a likelihood, a percentage, a binary output, a yes-no output, etc.) that a subset of the feature data is concurrently used (e.g., used, accessed, retrieved, requested, etc.) as the set of feature inputs for the machine learning model (e.g., a probability of the subset of the feature data being concurrently requested, accessed, retrieved, and/or the like by the machine learning model and/or a system thereof, etc.).

In some non-limiting embodiments or aspects, transaction service provider system 108 (e.g., data placement manager 122, etc.) determines or generates a probability that a subset of feature data is concurrently used as feature inputs to a machine learning model based on one or more machine learning techniques and/or clustering techniques (e.g., deep neural networks, etc.). For example, transaction service provider system 108 (e.g., data placement manager 122, etc.) generates a model (e.g., an estimator, a classifier, a prediction model, a clustering model, etc.) based on one or more machine learning techniques and/or clustering algorithms (e.g., a pattern recognition technique, a data mining technique, a heuristic technique, a supervised learning technique, an unsupervised learning technique, a decision tree algorithm, a gradient boosted decision tree algorithm, a neural network algorithm, a deep neural network algorithm, a convolutional neural network algorithm, etc.). As an example, transaction service provider system 108 (e.g., data placement manager 122, etc.) determines the probability using the model and/or clusters a subset of feature data together based on the probability.

In some non-limiting embodiments or aspects, transaction service provider system 108 (e.g., data placement manager 122, etc.) generates the model based on requests for feature data and/or feature data associated with feature inputs of the plurality of machine learning models 128a, 128b, . . . 128n. In some implementations, the model is designed to receive, as an input, the requests for feature data and/or the feature data associated with feature inputs of the plurality of machine learning models 128a, 128b, . . . 128n, and provide, as an output, a prediction (e.g., a probability, a binary output, a yes-no output, a score, a prediction score, a likelihood, etc.) as to whether a subset of the feature data will be concurrently accessed by the one or more machine learning algorithms of the plurality of machine learning models 128a, 128b, . . . 128n and/or clusters of feature data determined based on the probability. In some non-limiting embodiments or aspects, transaction service provider system 108 (e.g., data placement manager 122, etc.) stores the model (e.g., stores the model for later use). In some non-limiting embodiments or aspects, transaction service provider system 108 (e.g., data placement manager 122, etc.) stores the model in a data structure (e.g., a database, a linked list, a tree, etc.). In some non-limiting embodiments or aspects, the data structure is located within transaction service provider system 108 (e.g., data placement manager 122, etc.) or external (e.g., remote from) transaction service provider system 108 (e.g., data placement manager 122, etc.).

In some non-limiting embodiments or aspects, transaction service provider system 108 (e.g., data placement manager 122, etc.) processes the requests for feature data and/or the feature data associated with feature inputs of the plurality of machine learning models 128a, 128b, . . . 128n to obtain training data for the model. For example, transaction service provider system 108 (e.g., data placement manager 122, etc.) processes the requests and/or the feature data to change the requests and/or feature data into a format that is analyzed to generate the model. The requests and/or the feature data that is changed may be referred to as training data. In some implementations, transaction service provider system 108 (e.g., data placement manager 122, etc.) processes the requests and/or the feature data to obtain the training data based on receiving the requests and/or the feature data and/or receiving an indication to process the requests and/or the feature data from a user, such as when transaction service provider system 108 (e.g., data placement manager 122, etc.) receives an indication to creates a model.

Additionally or alternatively, when analyzing the training data, transaction service provider system 108 (e.g., data placement manager 122, etc.) processes the requests and/or the feature data by determining one or more variables based on the requests and/or the feature data. In some non-limiting embodiments or aspects, a variable includes a metric, associated with data being accessed concurrently, which is derived based on the requests and/or the feature data. The variable is analyzed to generate a model. In some non-limiting embodiments or aspects, transaction service provider system 108 (e.g., data placement manager 122, etc.) analyzes the training data to generate a model (e.g., a prediction model, a clustering model, etc.). For example, transaction service provider system 108 (e.g., data placement manager 122, etc.) uses machine learning techniques and/or clustering techniques to analyze the training data to generate the model. In some implementations, generating the model (e.g., based on training data obtained from the requests and/or the feature data) is referred to as training the model. The machine learning techniques include, for example, supervised and/or unsupervised techniques, such as decision trees (e.g., gradient boosted decision trees), logistic regressions, artificial neural networks (e.g., deep neural networks, convolutional neural networks), Bayesian statistics, learning automata, Hidden Markov Modeling, linear classifiers, quadratic classifiers, association rule learning, clustering algorithms, and/or the like. In some non-limiting embodiments or aspects, the model includes a prediction and/or clustering model that is specific to a particular machine learning model, a particular group of machine learning models, and/or particular feature data.

In some non-limiting embodiments or aspects, transaction service provider system 108 (e.g., data placement manager 122, etc.) identifies one or more variables (e.g., one or more independent image variables) as predictor variables that are used to make a prediction (e.g., when analyzing the training data). In some implementations, values of the predictor variables are inputs to the model. For example, transaction service provider system 108 (e.g., data placement manager 122, etc.) identifies a subset (e.g., a proper subset) of variables as predictor variables that are used to accurately predict whether a subset of the feature data is being concurrently used as a set of feature inputs for a machine learning model. In some implementations, the predictor variables include one or more of the variables, as discussed above, that have a significant impact (e.g., an impact satisfying a threshold) on a probability of the subset of the feature data being concurrently used as the set of feature inputs for the machine learning model.

In some non-limiting embodiments or aspects, transaction service provider system 108 (e.g., data placement manager 122, etc.) validates the model. For example, transaction service provider system 108 (e.g., data placement manager 122, etc.) validates the model after transaction service provider system 108 (e.g., data placement manager 122, etc.) generates the model. In some implementations, transaction service provider system 108 (e.g., data placement manager 122, etc.) validates the model based on a portion of the training data to be used for validation. For example, transaction service provider system 108 (e.g., data placement manager 122, etc.) partitions the training data into a first portion and a second portion, where the first portion is used to generate the model, as described above. In this example, the second portion of the training data (e.g., the validation data) is used to validate the model. In some non-limiting embodiments or aspects, the first portion of the training data is different from the second portion of the training data.

In some implementations, transaction service provider system 108 (e.g., data placement manager 122, etc.) validates the model by providing validation data associated with a subset of the feature data as input to the model, and determining, based on an output of the prediction and/or clustering model, whether the prediction or clustering model correctly, or incorrectly, predicted a probability of the subset of the feature data being concurrently used as the set of feature inputs for the machine learning model and/or grouped the feature data into clusters. In some implementations, transaction service provider system 108 (e.g., data placement manager 122, etc.) validates the model based on a validation threshold (e.g., a threshold value of the validation data). For example, transaction service provider system 108 (e.g., data placement manager 122, etc.) is configured to validate the model when a probability is correctly predicted by the model (e.g., when the prediction model correctly predicts 50% of the validation data, when the prediction model correctly predicts 70% of the validation data, etc.). In some implementations, if transaction service provider system 108 (e.g., data placement manager 122, etc.) does not validate the model (e.g., when a percentage of validation data does not satisfy the validation threshold), then transaction service provider system 108 (e.g., data placement manager 122, etc.) generates additional prediction models. In some non-limiting embodiments or aspects, once the model has been validated, transaction service provider system 108 (e.g., data placement manager 122, etc.) further trains the model and/or creates new models based on receiving new training data. In some non-limiting embodiments or aspects, the new training data includes requests and/or feature data associated with a machine learning model that is different from a previous machine learning model.

In some non-limiting embodiments or aspects, transaction service provider system 108 (e.g., data placement manager 122, etc.) determines or generates the probability or probabilities using the model. As an example, transaction service provider system 108 (e.g., data placement manager 122, etc.) groups the feature data into clusters based on the probability or probabilities. In some non-limiting embodiments or aspects, transaction service provider system 108 determines another probability of a different subset of the feature data associated with another set of feature inputs of a different machine learning model than the machine learning model being concurrently requested by the different machine learning model, and clusters the feature data based on the probability and the another probability. As an example, transaction service provider system 108 (e.g., data placement manager 122, etc.) groups the feature data into clusters based on the probability or probabilities and the another probability or the another probabilities.

In some implementations, and referring also to FIG. 5, at reference number 506, transaction service provider system 108 (e.g., data placement manager 122, etc.) clusters the feature data across the plurality of data sources 120a, 120b, . . . 120n. For example, for the set of features inputs A, B, C, D, and E associated with first and second machine learning models 128a and 128b (e.g., A, B, and C associated with first machine learning model 128a and C, D, and E associated with second machine learning model 128b), transaction service provider system 108 (e.g., data placement manager 122, etc.) may cluster feature data (e.g., feature data elements, such as, a particular account identifier, a particular IP address, a particular mailing address, particular feature data associated therewith, etc.) associated with the feature inputs according to the likelihood of particular data elements of the feature data being concurrently accessed (e.g., data elements of the feature data associated with the feature inputs A, B, C, D, and E may be clustered as {A_1, B_2, C_3}, {A_2, B_3, C_4}, {C_1, D_2, E_5}, etc.) by one or more of the plurality of machine learning algorithms 128a, 128b, . . . 128n.

As shown in FIG. 3, at step 306, process 300 includes storing a subset of feature data on a same cache node or server based on a probability. For example, transaction service provider system 108 stores a subset of feature data on a same cache node or server based on a probability. As an example, transaction service provider system 108 (e.g., data placement manager 122, etc.) stores the subset of the feature data on a same cache node or server of a plurality of cache nodes or servers 124a, 124b, . . . 124n based on the probability (e.g., based on the probabilities associated with subsets of the feature data, etc.). In such an example, transaction service provider system 108 may store feature data grouped in a same cluster on a same cache node or server of a plurality of cache nodes or servers 124a, 124b, . . . 124n.

In some non-limiting embodiments or aspects, storing the subset of the feature data on the same cache node or server uses a bin-packing algorithm. In some non-limiting embodiments or aspects, if transaction service provider system 108 determines another probability of a different subset of the feature data associated with another set of feature inputs of a different machine learning model than the machine learning model being concurrently requested by the different machine learning model, transaction service provider system 108 stores the subset of the feature data on the same cache node or server of the plurality of cache nodes or servers based on the probability and the another probability. For example, and referring also to FIG. 5, at reference number 508, transaction service provider system 108 (e.g., data placement manager 122, etc.) uses a bin-packing algorithm to place or store different clusters of data onto different cache nodes or servers of the plurality of cache nodes or servers 124a, 124b, . . . 124n at reference number 510. In such an example, transaction service provider system 108 (e.g., data placement manager 122, etc.) may place or store data with replication for a number N largest clusters (e.g., a number N of data clusters that are larger than other data clusters, a number N of data clusters that are above a threshold data size, etc.). As an example, for the set of features inputs A, B, C, D, and E associated with first and second machine learning models 128a and 128b (e.g., A, B, and C associated with first machine learning model 128a and C, D, and E associated with second machine learning model 128b), transaction service provider system 108 (e.g., data placement manager 122, etc.) may place or store data clusters {A_1, B_2, C_3} and {A_2, B_3, C_4} on a first cache node or server 124a, place or store data clusters {A_2, B_3, C_4} and {C_1, D_2, E_5} on a second cache node or server 124b, and place or store data clusters {A_2, B_3, C_4} and {C_1, D_2, E_5} on an additional cache node or server 124n, and/or the like. In such an example, for a particular PAN, transaction service provider system 108 (e.g., data placement manager 122, etc.) may initially co-locate an associated home address, home IP address, and home ZIP code on a same cache node or server of the plurality of cache nodes or servers 124a, 124b, . . . 124n, and when transaction service provider system 108 (e.g., data placement manager 122, etc.) detects a purchase of an air ticket with the PAN (e.g., via monitoring the data source stream at reference number 504), transaction service provider system 108 (e.g., data placement manager 122, etc.) may place or store the PAN with the travel destination IP range and destination ZIP range on the same cache node or server of the plurality of cache nodes or servers 124a, 124b, . . . 124n.

As further shown in FIG. 5, in some non-limiting embodiments or aspects, at reference number 512, transaction service provider system 108 (e.g., data placement manager 122, etc.) may update cluster lookup table 550 that can be accessed and/or used to find data and/or data clusters stored in the plurality of cache nodes or servers 124a, 124b, . . . 124n. For example, cluster lookup table 550 may be shared between and/or accessible by data placement manager 122 and data access manager 126. As an example, data placement manager 122 may update the cluster lookup table 550 in response to dynamically determining and/or updating the data clusters and/or data placement in the plurality of cache nodes or servers 124*a*, 124*b*, . . . 124*n*, and data access manager 126 may use the cluster lookup table 550 to identify a location of data and/or data clusters stored in the plurality of cache nodes or servers 124*a*, 124*b*, . . . 124*n* based on a request for a requested subset of the feature data. As an example, due to existing sharding and partitioning algorithms being based on hashing, transaction service provider system 108 (e.g., data placement manager 122, data access manager 126, etc.) may use a prefix of keys to control placement or storage and access to data clusters in the plurality of cache nodes or servers 124*a*, 124*b*, . . . 124*n* (e.g., for the set of features inputs A, B, C, D, and E associated with first and second machine learning models 128*a* and 128*b*, A, B, and C associated with first machine learning model 128*a*, and C, D, and E associated with second machine learning model 128*b*, a prefix of keys [abc]{A_1, B_2, C_3} and [abc]{A_2, B_3, C_4}, can be hashed by hash(abc) to 5 module 3, which may identify that the data is on the second cache node or server 124*b*, etc.)

Figure 4:
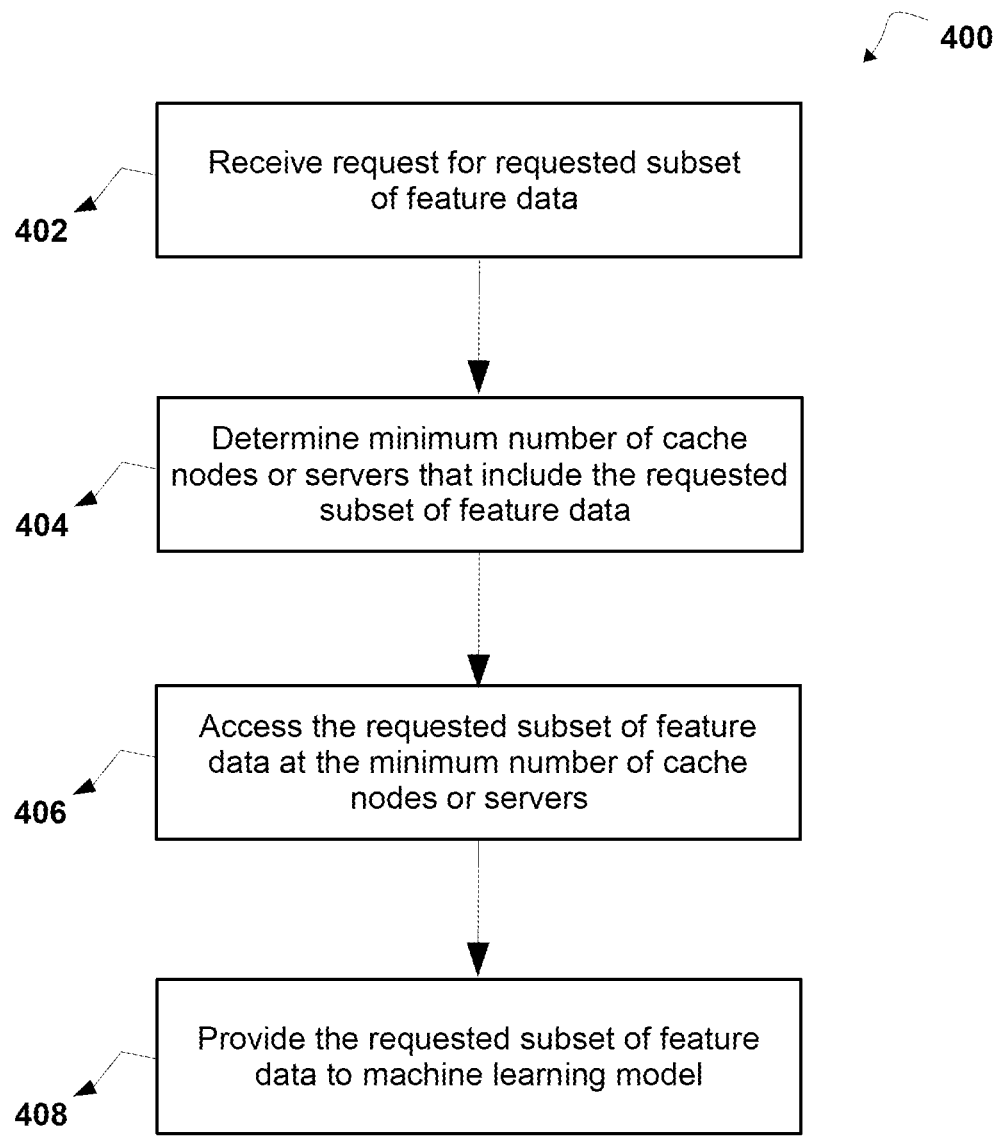
FIG. 4 is a flowchart illustrating a non-limiting embodiment or aspect of a process for data placement.

Referring now to FIG. 4, FIG. 4 is a flowchart of a non-limiting embodiment or aspect of a process 400 for data placement. In some non-limiting embodiments or aspects, one or more of the steps of process 400 may be performed (e.g., completely, partially, etc.) by transaction service provider system 108 (e.g., one or more devices of transaction service provider system 108). In some non-limiting embodiments or aspects, one or more of the steps of process 400 may be performed (e.g., completely, partially, etc.) by another device or a group of devices separate from or including transaction service provider system 108, such as merchant system 102 (e.g., one or more devices of merchant system 102), payment gateway 104 (e.g., one or more devices of payment gateway 104), acquirer system 106 (e.g., one or more devices of acquirer system 106), issuer system 110 (e.g., one or more devices of issuer system 110), and/or user device 112.

As shown in FIG. 4, at step 402, process 400 includes receiving a request for a requested subset of feature data. For example, transaction service provider system 108 receives a request for a requested subset of feature data. As an example, transaction service provider system 108 (e.g., data access manager 126, etc.) receives a request for a requested subset of the feature data. In such an example, the requested subset of feature data may be associated with a transaction at merchant system 102 and/or a request for training data for training one or more machine learning models of the plurality of machine learning models 128*a*, 128*b*, . . . 128*n*.

In some non-limiting embodiments or aspects, a request includes a combination of requested feature data or elements, such as, a mailing address, an IP address, an email address, a zip code, and/or any other transaction parameter with an account identifier (e.g., a PAN, etc.) associated with the request. For example, a request may be associated with a transaction at a merchant system with the account identifier. As an example, and referring also to FIG. 5, at reference number 514, transaction service provider system 108 (e.g., data access manager 126, etc.) may receive a request from a machine learning model and/or system thereof of the plurality of machine learning models 128*a*, 128*b*, . . . 128*n* and/or systems thereof.

As shown in FIG. 4, at step 404, process 400 includes determining a minimum number of cache nodes or servers that include the requested subset of feature data. For example, transaction service provider system 108 determines a minimum number of cache nodes or servers that include the requested subset of feature data. As an example, transaction service provider system 108 (e.g., data access manager 126, etc.) determines a minimum number of the plurality of cache nodes or servers 124*a*, 124*b*, . . . 124*n* that include the requested subset of the feature data.

In some non-limiting embodiments or aspects, determining the minimum number of the plurality of cache nodes or servers that include the requested subset of feature data uses a set cover algorithm. For example, transaction service provider system 108 (e.g., data access manager 126, etc.) may proxy a request to a corresponding cache node or server based on a combination of requested feature data or elements in the request. As an example, and referring also to FIG. 5, at reference number 516, transaction service provider system 108 (e.g., data access manager 126, etc.) may perform a set-based lookup by identifying or checking a set of keys for the subset of feature data requested by the request from the requesting machine learning model or system thereof by accessing cluster lookup table 550 at reference number 518 to identify one or more cache nodes or servers 124. For example, in contrast to existing caching clients which perform simple key-value look-up (e.g., cache.get (A_1) to a first cache node or server 602*a*, cache.get(A_3) to a second cache node or server 602*b* in FIG. 6, etc.), at reference numbers 520, 522, and 524 in FIG. 5, transaction service provider system 108 (e.g., data access manager 126, etc.) may use a set cover algorithm to find a minimum number of the plurality of cache nodes or servers 124*a*, 124*b*, . . . 124*n* (e.g., which may be a single cache node or server due to data placement manager 122 clustering and bin packing feature data likely to be accessed together on a same cache node or server, etc.) to access and/or retrieve the requested subset of feature data or feature elements. In such an example, transaction service provider system 108 (e.g., data access manager 126, etc.) may append an appropriate prefix of keys based on the set of keys to access or retrieve the requested subset of feature data or feature elements from the minimum number of the plurality of cache nodes or servers 124*a*, 124*b*, . . . 124*n* (e.g., for a set of keys Cache.get (A_1, B_3, C_5)? (A_1, B_3, C_6) (A_2, B_3, C_5), a prefix of keys Cache.read ([abc] (A_1, B_3, C_5)) may be applied, etc.).

As shown in FIG. 4, at step 406, process 400 includes accessing the requested subset of feature data at the minimum number of cache nodes or servers. For example, transaction service provider system 108 accesses the requested subset of feature data at the minimum number of cache nodes or servers. As an example, transaction service provider system 108 (e.g., data access manager 126, etc.) accesses the requested subset of the feature data at the minimum number of the plurality of cache nodes or servers. In such an example, transaction service provider system 108 (e.g., data access manager 126, etc.) may retrieve the requested subset of the feature data at the minimum number of the plurality of cache nodes or servers.

As shown in FIG. 4, at step 408, process 400 includes providing the requested subset of feature data to a machine learning model. For example, transaction service provider system 108 provides the requested subset of feature data to a machine learning model. As an example, transaction service provider system 108 (e.g., data access manager 126, etc.) provides the requested subset of the feature data to the machine learning model. In such an example, transaction service provider system 108 (e.g., data access manager 126, etc.) may transmit the requested subset of the feature data to the machine learning model (e.g., to one or more machine learning models of the plurality of machine learning models 128a, 128b, . . . 128n and/or systems thereof).

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects; but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system, comprising:
    a plurality of cache nodes or servers configured to store feature data;
    a cluster lookup table configured to identify locations of a plurality of subsets of the feature data distributed across the plurality of cache nodes or servers; and
    a data placement manager including at least one processor configured to:
        monitor a data source stream including the feature data and requests for the feature data, wherein the data source stream is continuously or periodically updated;
        dynamically cluster the feature data from the data source stream into the plurality of subsets of the feature data according to probabilities of data elements of the feature data being concurrently accessed;
        store the plurality of subsets of the feature data across the plurality of cache nodes or servers, wherein the feature data clustered in a same subset of the plurality of subsets is stored on a same cache node or server of the plurality of cache nodes or servers; and
        update the cluster lookup table.

2. The system of claim 1, wherein different subsets of the plurality of subsets of the feature data are stored onto different cache nodes or servers of the plurality of cache nodes or servers according to a bin-packing algorithm.

3. The system of claim 1, further comprising:
    a data access manager including at least one processor configured to:
        receive a request for a requested subset of the feature data; and
        access the cluster lookup table to identify one or more cache nodes or servers of the plurality of cache nodes or servers that include the requested subset of the feature data.

4. The system of claim 3, wherein the data access manager including at least one processor is further configured to:
    determine a minimum number of the plurality of cache nodes or servers that include the requested subset of the feature data; and
    access the requested subset of the feature data at the minimum number of the plurality of cache nodes or servers.

5. The system of claim 4, wherein the minimum number of the plurality of cache nodes or servers that include the requested subset of feature data is determined using a set cover algorithm.

6. The system of claim 1, wherein the plurality of subsets of the feature data are stored on and accessible from the plurality of cache nodes or servers according to a prefix of keys.

7. The system of claim 1, wherein the data source stream includes transaction data associated with a transaction initiated, processed, and/or currently being processed in a transaction processing network.

8. A method, comprising:
    monitoring, with at least one processor of a data placement manager, a data source stream including feature data and requests for the feature data, wherein the data source stream is continuously or periodically updated;
    dynamically clustering, with at least one processor of the data placement manager, the feature data from the data source stream into a plurality of subsets of the feature data according to probabilities of data elements of the feature data being concurrently accessed;
    storing, with at least one processor of the data placement manager, the plurality of subsets of the feature data across a plurality of cache nodes or servers, wherein the feature data clustered in a same subset of the plurality of subsets is stored on a same cache node or server of the plurality of cache nodes or servers; and
    updating, with at least one processor of the data placement manager, a cluster lookup table that identifies locations of the plurality of subsets of the feature data distributed across the plurality of cache nodes or servers.

9. The method of claim 8, wherein different subsets of the plurality of subsets of the feature data are stored onto different cache nodes or servers of the plurality of cache nodes or servers according to a bin-packing algorithm.

10. The method of claim 8, further comprising:
    receiving, with at least one processor of a data access manager, a request for a requested subset of the feature data; and
    accessing, with at least one processor of the data access manager, the cluster lookup table to identify one or more cache nodes or servers of the plurality of cache nodes or servers that include the requested subset of the feature data.

11. The method of claim 10, further comprising:
    determining, with at least one processor of the data access manager, a minimum number of the plurality of cache nodes or servers that include the requested subset of the feature data; and
    accessing, with at least one processor of the data access manager, the requested subset of the feature data at the minimum number of the plurality of cache nodes or servers.

12. The method of claim 11, wherein determining the minimum number of the plurality of cache nodes or servers that include the requested subset of feature data uses a set cover algorithm.

13. The method of claim 8, wherein the plurality of subsets of the feature data are stored on and accessible from the plurality of cache nodes or servers according to a prefix of keys.

14. The method of claim 8, wherein the data source stream includes transaction data associated with a transaction initiated, processed, and/or currently being processed in a transaction processing network.

15. A computer program product comprising at least one non-transitory computer-readable medium including program instructions that, when executed by at least one processor, cause the at least one processor to:

monitor a data source stream including feature data and requests for the feature data, wherein the data source stream is continuously or periodically updated;

dynamically cluster the feature data from the data source stream into a plurality of subsets of the feature data according to probabilities of data elements of the feature data being concurrently accessed;

store the plurality of subsets of the feature data across a plurality of cache nodes or servers, wherein the feature data clustered in a same subset of the plurality of subsets is stored on a same cache node or server of the plurality of cache nodes or servers; and update a cluster lookup table that identifies locations of the plurality of subsets of the feature data distributed across the plurality of cache nodes or servers.

16. The computer program product of claim 15, wherein different subsets of the plurality of subsets of the feature data are stored onto different cache nodes or servers of the plurality of cache nodes or servers according to a bin-packing algorithm.

17. The computer program product of claim 15, wherein the program instructions, when executed by the at least one processor, further cause the at least one processor to:

receive a request for a requested subset of the feature data; and access the cluster lookup table to identify one or more cache nodes or servers of the plurality of cache nodes or servers that include the requested subset of the feature data.

18. The computer program product of claim 17, wherein the program instructions, when executed by the at least one processor, further cause the at least one processor to:

determine a minimum number of the plurality of cache nodes or servers that include the requested subset of the feature data; and access the requested subset of the feature data at the minimum number of the plurality of cache nodes or servers.

19. The computer program product of claim 18, wherein determining the minimum number of the plurality of cache nodes or servers that include the requested subset of feature data uses a set cover algorithm.

20. The computer program product of claim 15, wherein the data source stream includes transaction data associated with a transaction initiated, processed, and/or currently being processed in a transaction processing network.

* * * * *